Nov. 21, 1950

L. KÖRÖS 2,530,579

SPEECH INVERTER

Filed Oct. 15, 1946

INVENTOR
Ladislao Koros
BY H. S. Grover
ATTORNEY

Patented Nov. 21, 1950

2,530,579

UNITED STATES PATENT OFFICE 2,530,579

SPEECH INVERTER

Ladislao Körös, Buenos Aires, Argentina, assignor to Radio Corporation of America, a corporation of Delaware Application October 15, 1946, Serial No. 703,435

3 Claims. (Cl. 179—1.5)

Figures 1, 2:
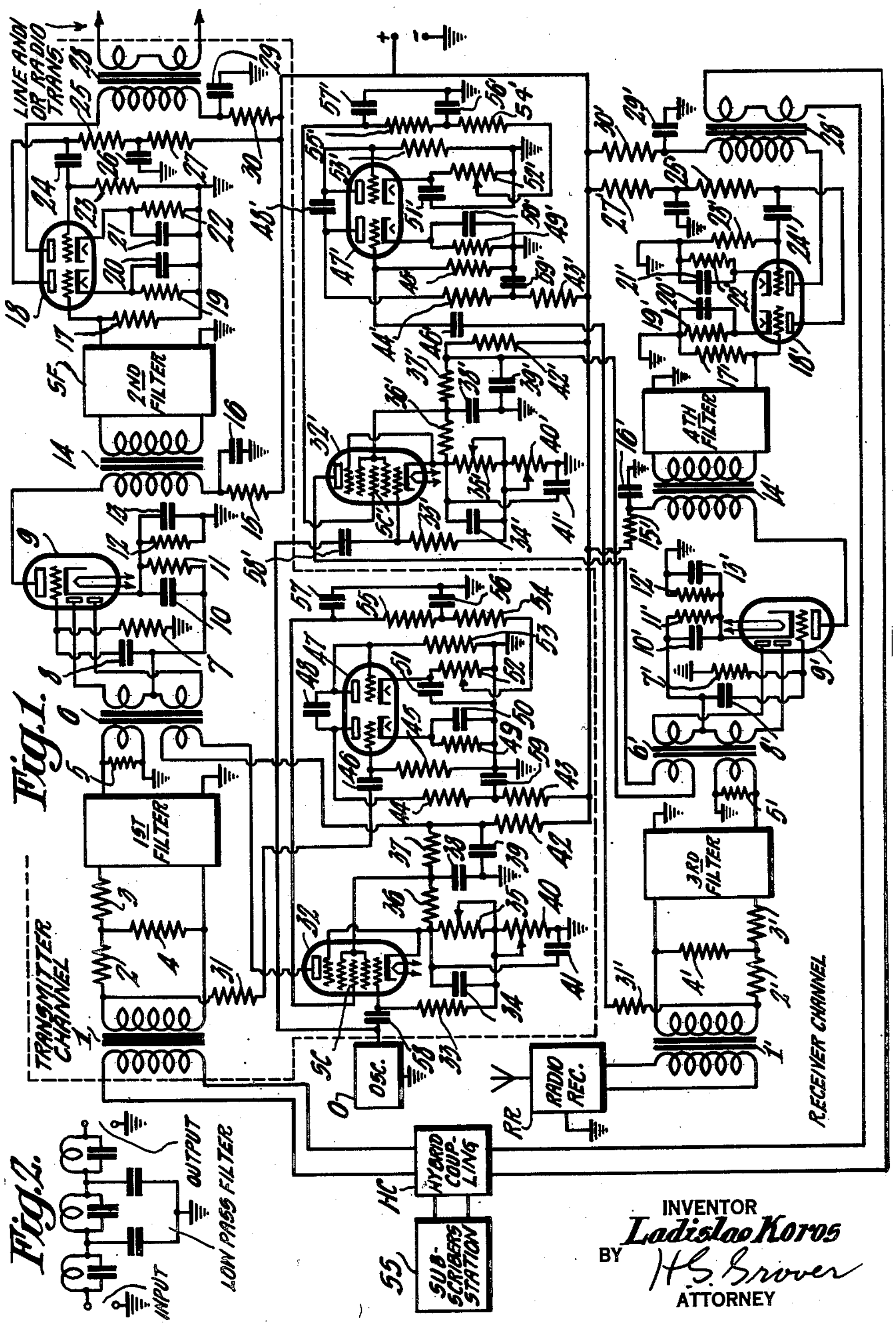

This application discloses a new and improved method of and means for amplifying and relaying speech currents and the like signals. The novel apparatus described is particularly applicable to two-way telephonic communications and has as its object, improvement of radio telephone communication systems wherein speech inversion takes place for secrecy purposes.

Other somewhat more specific objects of my invention will be set forth in the detailed description which follows. In this description, reference will be made to the attached drawing wherein:

Fig. 1 illustrates by circuit element and element connection, a speech inverter arranged in accordance with my invention, while Fig. 2 illustrates a low pass filter circuit suitable for use in my speech inverter.

There are in use different kinds of speech inverters in the telecommunication service. The common practice is to let the intelligence flow through a low-pass filter which prevents those higher frequencies which are not important for the intelligibility of the speech from passing into the following circuits. This limit will often be chosen at 2700 C. P. S. so that the first filter will allow to pass $$f_s < 2700 \text{ C. P. S.}$$

This frequency spectrum will be introduced into a modulator together with a carrier frequency, $f_c$, which will be modulated with these $f_s$ frequencies. The usual $f_c=3000$ C. P. S. The modulator is generally a balanced one and produces different frequency groups. The main groups are the $f_c+f_s$ and $f_c-f_s$ frequencies with different parasitic frequency groups. The output intelligence from the modulator flows through a second low pass filter. The cut-off frequency of the second low-pass filter could be the same as the cut-off frequency of the first filter, for example, 2700 C. P. S. so that the second low-pass filter allows the $f_c-f_s$ frequency spectrum and some of the parasitic groups to pass. Using $f_c=3000$ C. P. S. and the cut-off frequency 2700 C. P. S. for the filters, the transmitted inverted frequency spectrum will be 300 to 2700 C. P. S. and for each $f_s$ input frequency an $f_c-f_s$ frequency will correspond i. e., $3000-f_s$ C. P. S. A practical example: if the input $f_s=400$ C. P. S. the corresponding inverted frequency is $3000-400=2600$ C. P. S.

This inverted frequency group will be transmitted now in the normal manner, i. e., a radio frequency carrier will be modulated with this inverted intelligence in the case of radio transmission service or will be sent over the telephonic line for telephone service.

In the receiving end the $f_c-f_s$ frequencies will be treated in exactly the same manner as the original input intelligence in the transmitting equipment. The inverted intelligence will flow through the receiving channel of the speech inverter and in a similar manner the $f_c-(f_c-f_s)=f_s$ frequency group will be selected again, which is the sending end input frequency. The $f_c-f_s$ frequency group emitted from the sending end cannot be understood with a common receiver so that the system assures privacy for those who have at their disposal the described speech inverter apparatus.

In the practical designs, often the well known system of balanced modulator will be used to mix the $f_s$ intelligence with the $f_c$ frequency. The ideal case that only the $f_c-f_s$ frequency group and nothing else should be transmitted is not generally fulfilled. In the same manner in the receiving end the finally produced frequency group contains other frequencies than the originally transmitted $f_s$.

There exist different modulator systems. Each system produces besides the $f_c \pm f_s$ frequency group, other frequencies. Four different combinations of parasitic frequency groups, shown in Table I, are produced according to the different circuits of the modulators. In the literature there are data about modulator systems, for example, "Applied Electronics", editor John Wiley & Sons, edition 11/43, pages 688 to 690.

TABLE I

| Case | Parasitic Frequency Groups |
|---|---|
| 1 | $f_s$ |
| 2 | $f_c$ |
| 3 | $f_s$, $2f_s$, $f_c$, $2f_c$ |
| 4 | $2f_s$, $2f_c$ |

From the $f_c \pm f_s$ frequency group, produced by the modulator, the above mentioned low pass filter, generally with the $f_c$=infinite attenuation frequency, cancels out the $f_c+f_s$ group, but cannot cancel out the parasitic frequency groups of Table I, insofar as these parasitic frequencies are below the $f_c$ frequency.

It is a further object of my invention to eliminate or at least reduce in the system, parasitic frequencies of the groups listed in Table I, to thereby insure fair intelligibility of the twice-inverted signal.

It can be demonstrated that with a good choice of the relation of the level of $f_s$ and $f_c$, the parasitic frequency groups can be reduced to a low limit that will assure a fair intelligibility of the received double inverted intelligence.

In Fig. 1, I have illustrated a signalling system of the general type described above arranged to include novel features of my invention, means to reduce said parasitic frequencies. The intelligence introduced in the transformer 1 might come from a subscriber station SS by way of a hybrid coupling HC. The transformer 1 may supply speech currents from its secondary winding through an attenuating network comprising resistors 2, 3 and 4 to a first filter supplying the primary winding of the transformer 6 having two primaries. The other primary winding of the transformer 6 may be coupled by an amplifier tube 32 to an oscillator O. This coupling includes the condenser 58 and grid bias resistor 33, between oscillator O and the input of tube 32 and the primary winding of transformer 6 coupled to the anode of tube 32. This winding is also in the D. C. path to the plate source.

The gain of the amplifier tube 32 is controlled in accordance with my invention, as will appear in detail hereinafter, in a direction to expand the amplitude of the oscillations fed to the transformer 6 as the signal level in transformer 1 rises. Tube 9 comprises two diodes in a balanced modulator circuit and also a triode in an amplifier circuit. The diodes are in a balanced converter circuit including load resistor 11 and shunt condenser 10. The grid of the triode is coupled by condenser 8 to load 11. The resistor 12 is for bias purposes. The operation of the balanced modulator and tube 9 will be understood by those versed in the art and will be described hereinafter. The output of the balanced modulator, amplified in the tube 9, is supplied to the transformer 14 and thence to a second filter SF and to a double tube 18 wherein it is amplified and supplied to the output transformer 28. The tube 18 is a double triode in a resistance-capacitive coupled amplifier. Resistor 17 is the grid bias resistor. Resistors 19 and 22 are cathode return resistors and condensers 20 and 21 are for bypass purposes. Resistor 25 forms the anode load for the first triode and capacitor 24 feeds the signals to the grid of the second triode. The output from the transformer 28 may be supplied to a transmitter and/or a line as desired. In my use of the speech inverter, the line output supplies a radio transmitter.

The receiver channel is similar to a large extent, to the transmitter channel. Signals might be derived from a radio receiver RR and supplied as input to a transformer 1′ and from the transformer to an attenuating network and so forth. In the receiver channel, I have used numerals corresponding to the numerals used in the transmitter channel except that the numerals in the receiver channel have been primed. The receiver output from transformer 28′ might be supplied by way of the hybrid coupling unit HC to the subscriber station.

In accordance with my invention, oscillations from the oscillator O are supplied by tube 32 to transformer 6 for mixing and speech inverting purposes in modulator 9. Oscillations from O are likewise supplied in accordance with my invention to the control grid of tube 32′ and after amplification in this tube to the secondary winding of transformer 6′ for conversion and speech inversion (re-inversion) in the tube 9′. Furthermore, in accordance with my invention, the signals from the transformer 1 are supplied by resistance 31 and coupling condenser 46 to the control grid of a double triode tube 47, the first section of which is an amplifier. The envelope of tube 47 also includes a second triode in a diode rectifier circuit. The amplified signals are supplied by condenser 48 to the anode and control grid of the rectifier section of the tube which are tied together and the rectifying action sets up in resistor 53 and potentiometer resistor 52, a potential which waxes and wanes as the level of the rectified signal changes. This potential is supplied by resistor 54, filter network comprising resistor 55 and capacitors 56 and 57 to a control grid SC in tube 32 to control the gain of this tube. Note that as the signal level at the transformer 1 rises, the potential across resistor 52 towards the diode cathode end becomes less negative as does the potential supplied to the control grid SC of tube 32 so that the gain of tube 32 goes up when the signal level rises and the amplitude of the oscillations in the primary winding of transformer 6 rises in a corresponding manner. Tubes 32′ and 47′ operate in a corresponding manner to expand the amplitude of the oscillations from O supplied by tube 32′ to the primary winding of 6′ when the signal level in the secondary winding of transformer 1′ rises.

In Fig. 1, the intelligence is introduced in the input transformer 1 and flows through the first filter. In the transformer 6 is added the $f_c=3000$ C. P. S. $f_c$ could be chosen for another frequency, the 3000 C. P. S. being given only as an example. The invention is not limited to the choice of any value of frequencies.

The $f_c$ frequency will be produced by the oscillator O and amplified by tube 32. The plate transformer of 32 is the above mentioned transformer 6. The two diode rectifiers of 9, with the load resistor 11 and condenser 10, will modulate the intelligence with the carrier frequency according to the well known principle of the balanced modulator and the triode part of the same tube 9 will amplify the product. A similar circuit is used in a speech inverter used by my assignee, which is in turn similar to the speech inverter shown in Jacobi et al. application Serial #599,830, filed June 16, 1945. In the plate circuit of the triode part of 9 and consequently in the transformer 14 the $f_c \pm f_s$ frequency group and the $2f_s$ and $2f_c$ frequency groups will be present as in the case 4 of Table I.

The invention is not limited to the use of this form for mixing $f_s$ and $f_c$. Fig. 1 shows only one practical realization of a speech inverter, and its modulator could be substituted in any other system. To avoid repeating descriptions, in this specification, this form of the modulator will be used, but any other modulator system and frequency values could be used to build a speech inverter according to the present invention.

We will choose in this special example the limits of the transmitted intelligence between 300 and 2700 C. P. S., and $f_c=3000$ C. P. S. The same $f_c=3000$ C. P. S. should be in this special example the first maximum attenuation frequency of the first and second filters. The second filter SF will attenuate heavily the $f_c+f_s$ frequency groups and the $2f_c$ frequency and all those $2f_s$ frequencies where $$2f_s > f_c$$

but will let pass from the parasitic frequency groups of case 4, Table I, the $2f_s < f_c$ frequencies.

In practice, the attenuation could be about 30 to 60 db. for those frequencies where the low pass filter attenuates, i. e. over $f_c=3000$ C. P. S.

The symbol of $(2f_s)$ will be used for all of the $2f_s$ frequencies below the $f_c$ limit. $(2f_s)$ will remain in the output together with the inverted intelligence $f_c-f_s$, and represents a distortion. This $(2f_s)$ is in one octave relation with the incoming intelligence, i. e., it is not inverted. If the level of the $(2f_s)$ group is high enough, the input direct intelligence can be understood with a common receiver. The doubling of the input frequencies does not impede the intelligibility of the speech. In this event the purpose of the speech inversion, which is privacy, will not be fulfilled. Experience shows that the parasitic $(2f_s)$ frequency groups can be reduced to a negligible value by using about 20 db. higher level for $f_c$ than for $f_s$ in the modulator which is formed by the diodes of the tube 9, in Fig. 1. Using a higher level difference than 20 to 30 db. between $f_s$ and $f_c$, the $(2f_s)$ frequency group will not be reduced appreciably more, but the $f_c$ and $2f_c$ frequencies will be increased in the input and output unnecessarily.

The $f_c$ and $2f_c$ frequencies in the input and output can cause disturbance. The $f_c$ and the $2f_c$ frequencies can be reduced to inaudibility in the output by the second filter and the $f_c$ frequency can also be reduced to inaudibility in the input line by the first filter, provided that the level of the $f_c$ frequency is selected in accordance with the above description. Let us suppose for a practical case that the attenuation for the first filter is 50 db. for $f_c=3000$ C. P. S. and for the $2f_c=6000$ C. P. S. and the attenuation of the second filter is also 50 db., and that we use 20 db. higher $f_c$ level than the intelligence. The supposed attenuation of 50 db. is a very good value which will be found in exceptionally well made speech inverter equipment. The output and the input line will have in this case 50 db.—20 db.=30 db. level in the $f_c$ and $2f_c$ frequencies below the level of the intelligence. This can be considered as a fair difference between the inverted intelligence and the $f_c$ and $2f_c$ frequencies, provided that the intelligence is present in the line but appears as a disturbing noise if the intelligence stops or if its level is lowered. We will investigate a numeric example:

The normal conversation speech, $f_s$, contains level differences of 26 db. between its loudest and lowest periods. For example, we suppose that in a common speech inverter system the level of the $f_c$ frequency in the diodes of tube 9 will be selected 20 db. higher than the loudest $f_s$ frequency, and no output amplifier is used.

The absolute peak level should be +10 db. (0 level=1 mw. in 500 ohms) at the diode plates of 9. In this case, the absolute level of $f_c=3000$ C. P. S. will be +10 db.+20 db.=+30 db. at the same diode plates. In the output and input lines, after the first and second filters, the 6000 and 3000 C. P. S. absolute level will be +30 db.—50 db=—20 db. In this calculation we suppose that the level of 3000 and 6000 C. P. S. is the same, which will be fulfilled approximately in a general case.

We will investigate now the situation with the minimum level of speech, which is the absolute level of +10 db.—26 db.=—16 db., supposing the level differences in speech amount to 26 db. We see that the noise level from the 3000 and 6000 C. P. S. below the minimum speech level is only 4 db.; i. e. —16 db.—(—20 db.)=4 db. This means practically that the lowest levels of intelligence cannot be understood due to the high 6000 and 3000 C. P. S. noise level. If the intelligence stops, the line carries —20 db. 6000 or 3000 C. P. S. noise which might be very inconvenient as disturbance produced in parallel lines provided that the balance and insulation between them is imperfect as is very often the case.

In good engineering practice, the maximum attenuation for speech inverter filters is about 30 to 60 db. The relative noise level in the lines could be improved theoretically by using a higher attenuation for the 3000 and 6000 C. P. S. filters. The difficulty in this case will be in the frequency response of the intelligence with normal filter dimensions, by using common quality materials. Q=20 is a fair value for one filter element. Using 3 filter sections in the first and second filter as shown in Fig. 2, for example, the frequency response of ±4 db. can be assured between 300 and 2700 C. P. S. for the inverted intelligence, that is, about the maximum difference that can be tolerated. Using more filter sections of the same quality, the frequency response will be worse. Without increasing the size and the production cost of the speech inverter, the common speech inverters have no possibility of producing a service with less noise. The noise level can also rise easily if the $f_c$ frequency, which will be produced generally by an oscillator, has any drift. If the $f_c=3000$ C. P. S. is changed for example, to 2900 C. P. S. the attenuation of the filter normally —50 db. could become —15 db., so that the noise level of the new $f_c=2900$ and $2f_c=5800$ rises considerably.

Another incorrect attempt to reduce this noise in the common speech inverter systems is the reduction of the level of the $f_c=3000$ C. P. S. in order to lower the noise level. If the level of $f_c$ were only 10 db. and not 20 db. higher than the peak of the intelligence, the difference between the lowest intelligence and the level of 6000 or 3000 C. P. S. would be 14 db. after the filter and not 4 db. as calculated before, and the absolute level of $f_c$ in the line —30 db. and not —20 db. as before. This value is not good enough from the noiseless transmission standpoint, but this arrangement is also bad from the secrecy standpoint. The peaks of the speech, having only 10 db. difference between $f_s$ and $f_c$, would pass as a double frequency and could be understood with common receivers. Entire words could cross directly in this arrangement. Also in the receiver end when listening with a speech inverter, these direct crossing words would make serious distortion, being inverted at this point and the intelligibility decreasing appreciably.

This invention gives what I believe is a perfect solution to these problems. With it the level of the $f_c$ will be controlled in accordance with the incoming intelligence level, so that a previously fixed difference will be assured between the $f_c$ and $f_s$ levels. This difference could be, for example, 20 db., therefore there will be at all times enough $f_c$ present in the modulator. The $(2f_s)$ group remains low at all times and on the other hand the $f_c$ and $2f_c$ frequencies, because of their fixed level relation with the intelligence, cannot disturb the line. When the intelligence stops, the $f_c$ level could be reduced to a very low value, which cannot be detected in the line. In Fig. 1 this change of $f_c$ level will be produced by the tube 32. I have chosen in this special example for the tube 32 the RCA 6L7 tube. The tube 32 works in the well known form of a volume expander. The grid of one section of the double triode 47, which is an RCA 6SN7, is coupled with the attenuator resistors 31, 45 and condenser 46 to the input transformer 1. The second section of the tube 47 works in this case as a diode rectifier and produces with its filter system; resistors 52, 54, 55 and condensers 51, 56 and 57; a direct current control voltage, the value of which depends on the input level. It will be noted that instead of one double triode in place of 47, any triode or pentode amplifier with any rectifier could be used, and this invention is not limited whatsoever by the use of any type of tube. In special cases, the amplifier stage could be omitted, provided the input level is high enough to drive the rectifier.

The effect of $f_c$=3000 C. P. S., in the input grid of tube 47 is reduced by the first filter and an attenuator formed by the resistors 2, 3 and 4.

The first grid of the tube 32 will be excited by the $f_c$ frequency oscillator O. The oscillator can be formed by one or more electronic tubes in the well known manner, or may be a rotating generator. The supercontrol grid SC of 32 is biased negatively to a value so that the output from 32 on the diode plates of tube 9 has a low value, for example, −30 db. This is the standby position of the speech inverter. If input intelligence is present, the input grid of the tube 47 will be excited and the direct current voltage developed by the diode of 47 will neutralize more and more the negative bias of the supercontrol grid of tube 32 and the level of $f_c$ increases over the diode plates of 9. By the correct choice of the voltages and the resistance values, it is possible to assure that the level of the $f_c$ will follow the input level with a prefixed difference and in this form the correct inversion of the speech for any input level will be assured. In a case where a very wide dynamic range, such as 30 db. level difference or more is applied to the input, the modulation process has its necessary level of $f_c$ and never more than necessary. Words pronounced with exceptional loudness cannot pass directly in this system because the necessary $f_c$ level will always be assured from the input level of the speech itself. Peaks outside of the mentioned 30 db. dynamic range are also not transmitted directly. The expander will be driven to a point in its range where it is no longer working in a linear form. This means that the distortion can increase for the peaks, but the intelligence does not cross the speech inverter directly. If the input intelligence is lower, the $f_c$ level becomes automatically lower also, so that the noise level of the $2f_c$ and $f_c$ is for any input level 50 db.−20 db.=30 db. lower than the intelligence which is present in the line, supposing that the filters have 50 db. attenuation for $2f_c$ and $f_c$ and the level of the $f_c$ is 20 db. higher than the intelligence. This difference of 30 db. is a fair value and cannot be detected below the intelligence.

If the intelligence stops, the absolute level of $f_c$ in the modulator of 9 can be as low as −30 db. In this case −30 db.−50 db.=−80 db. is the level of $2f_c$ and $f_c$ in the line, having at all times the attenuation of 50 db. from the filters. This attenuation until 80 db. in the line is an excellent result which could practically never be obtained with the common speech inverter systems. This −80 db. signal level will be attenuated more on the input side, having the attenuator 2, 3 and 4 in the path of the $f_c$ frequency which could produce in a practical case an additional attenuation of about 6 to 12 db.

In the output line the absolute level of the $2f_c$ together with the intelligence, will be amplified by the triode unit of the tube 9 and by the output amplifier 18. It should be mentioned that this invention is not limited to the use of a double diode and triode unit 9 and also not to the use of a double triode 18 and finally it has no importance for this invention if any amplifier tube is present or not after the modulator, although the circuit shown in Fig. 1 is a good practical example of a speech inverter designed for using the principles of this invention.

An objection which may arise to this system could be that the time constant of the expander given by the resistances 52, 54, 55 and condensers 51, 56 and 57 could disturb the exact form of the operation of this invention because of not having enough level of $f_c$ over the diode plates of 9, at the moment when the intelligence starts. On the other hand the $f_c$ does not disappear immediately once the speech has stopped. Experiments show that fortunately those theoretical objections do not make any audible effect, provided the time constant of the expander system is fairly short. A multi-stage resistor-condenser filter system like that shown in Fig. 1 gives very good results, producing the necessary filter effect for the direct current voltage for the bias of the tubes 32 and relatively short time constant. In Table II are given several values for the important resistances and condensers of a practical construction like Fig. 1 of the present invention, for the use of $f_c$=3000 C. P. S.

TABLE II

Figure 1

| Resistors | Value Ohms | Capacitors | Value μf |
|---|---|---|---|
| 2, 3 | 270 | 10, 38 | 0.001 |
| 4 | 560 | 34, 41 | 8 |
| 5 | 800 | | |
| 11 | 60,000 | 46, 51, 56, 57 | 0.1 |
| 31 | 100,000 | | |
| 35 | 350 | | |
| 36 | 15,000 | | |
| 37 | 20,000 | | |
| 40 | 700 | | |
| 45 | 250,000 | | |
| 52 | 280,000 | | |
| 53, 54, 55 | 100,000 | | |

Speech inverters in practice have two channels, one for transmission and one for reception, which are made generally in the same form, as shown in Fig. 1. The values for the resistors and condensers in the receiver channel which have the same number but are primed, are the same as those used in the transmission channel.

These two channels could have only one $f_c$ oscillator O and this oscillator gives the necessary excitation for the expander tubes in each channel. A cross-talk between the two channels cannot occur via the $f_c$ oscillator because the expander tubes 32 and 32′ are working like separators between them. The plate supply is generally common for the two channels. The decoupling elements; resistors in combination with condensers 15 and 16, 15′ and 16′; 30 and 29, 30′ and 29′; 42 and 39, 42′ and 39′; 43 and 59, 43′ and 59′ or neon voltage stabilizers may be used in the common way to prevent a cross-talk through the power supply.

It will be noted that no special explanation was given for such elements of Fig. 1 as are commonly used in ordinary amplifier technique. The resistor 12 is the bias resistor for the tube 9 which could be an RCA 6SR7, and the condenser 13 is its by-pass condenser. 8 is the grid coupling condenser and 7 the grid resistance for the triode part of 9. The transformer 14 is the coupling between the plate of the triode unit of 9 and the second filter. The second filter is loaded by the resistor 17. 19 is the bias resistor for the first triode of 18. 18 may be an RCA 6SN7 tube. 22 is the bias resistor for the second triode of the same tube. 20 and 21 are the by-pass condensers for the bias resistors. 24 is the coupling condenser between the two triode units of 18, and 23 the grid resistor of the second triode, while 25 is the plate resistor of the first triode of 18. 28 is the output transformer of the transmitter channel. The primary winding of 28 is in the plate circuit of the second triode unit of 18. 58 is the coupling condenser of the first grid of 32; 33 is the grid resistance of the same. Resistors 35 and 40 are delivering the grid bias for the first and third grid of 32. The voltage dividers 36 and 37 supply the screen grid voltage of the same tube. 38 and 39 are the by-pass condensers for the screen and plate circuits of the same tube. 45 is the grid resistor for the triode part of tube 47, which tube may be an RCA 6SN7; 49 is the cathode bias resistor for the same unit and 50 is its by-pass condenser. 48 is the coupling condenser between the triode and diode unit of 47. The diode rectifier is made by short circuiting the plate and grid of the second unit. The resistor 53 is parallel with the tube in accordance with the well known principle of the tube voltmeters. In resistor 52 and condenser 51 the compensating grid voltage will be developed for the third grid of 32, which grid voltage will be supplied by the filter system, described previously. The receiver channel has the same elements as the transmitter channel. The corresponding parts in the receiver channel carry an apostrophe.

It is clear that this system may be combined in different forms, using other circuits than shown in Fig. 1 with different values of the elements or by using a different kind of modulator system. All the descriptions given in this paper for Fig. 1 and 2 and Table II represent only one practical design from the numerous other possibilities of this invention.

What is claimed is:

1. In a speech inverter having an input to which speech signals are applied: an attenuator coupled to said input for attenuating said signals; a filter coupled to the output of said attenuator; a modulator coupled to the output of said filter receptive of carrier energy and of filtered attenuated speech signals; and means for maintaining a predetermined ratio between the level of the carrier energy supplied to said modulator and the level of the speech signals impressed on the modulator, said means including an amplifier tube having a gain-controlling electrode therein and having an output electrode, a source of carrier energy, means for applying carrier energy from said source to said tube for controllable-gain amplification of the same therein, means coupling said gain-controlling electrode to said input to make the gain of said tube responsive to applied speech signals, said last-mentioned means including a rectifier for rectifying speech signals derived from said input, and means connecting said output electrode to said modulator to supply carrier energy thereto from said tube.

2. In a speech inverter with two channels each having an input to which speech signals are applied and each having output connections: a filter for each channel; means coupling each of said filters to a corresponding one of said inputs; a separate modulator coupled to the output of each filter receptive of carrier energy and of filtered speech signals in the corresponding channel; means for maintaining a predetermined ratio between the level of the carrier energy supplied to each modulator and the level of the speech signals impressed on the same modulator, said last-mentioned means including an amplifier tube for each channel, each tube having a gain-controlling electrode therein and having an output electrode, a common source of carrier energy for the two channels, means for applying carrier energy from said source to each of said tubes for controllable-gain amplification of the same therein, means connecting each of the output electrodes to a corresponding one of said modulators to supply energy thereto from the corresponding amplifier tube, and means coupling each gain-controlling electrode to the input of that channel corresponding to the modulator to which the corresponding amplifier tube output is connected, thereby to control the gain of the respective amplifier tube in accordance with the average magnitutde of speech signals fed to that modulator; a separate filter coupled to the output of each modulator; and means coupling the output of each of said last-mentioned filters to the output connections of the corresponding channel.

3. In a speech amplifier system having an input to which speech signals are applied, an oscillatory energy generator of carrier frequency, a modulator coupled to said input, receptive of carrier energy and of speech signals, for modulating said carrier energy by said signals, an amplifier of controllable gain coupling said generator to said modulator to feed controllably-amplified carrier energy to said modulator, and means for controlling the gain of said amplifier in accordance with the signal magnitude at said input, to make the level of the oscillatory energy of carrier frequency fed to the modulator substantially twenty decibels higher than the level of the speech signals impressed on the modulator.

LADISLAO KÖRÖS.

REFERENCES CITED

The following references are of record in the file of this patent:

UNITED STATES PATENTS

| Number | Name | Date |
|---|---|---|
| 1,563,326 | Bown | Dec. 1, 1925 |
| 1,571,010 | Kendall | Jan. 26, 1926 |
| 1,806,666 | Bown | May 26, 1931 |
| 2,014,081 | Csepely | Sept. 10, 1935 |
| 2,029,389 | Ringel | Feb. 4, 1936 |
| 2,207,249 | Goldsmith | June 9, 1940 |
| 2,402,059 | Craib | June 11, 1946 |